UNITED STATES PATENT OFFICE.

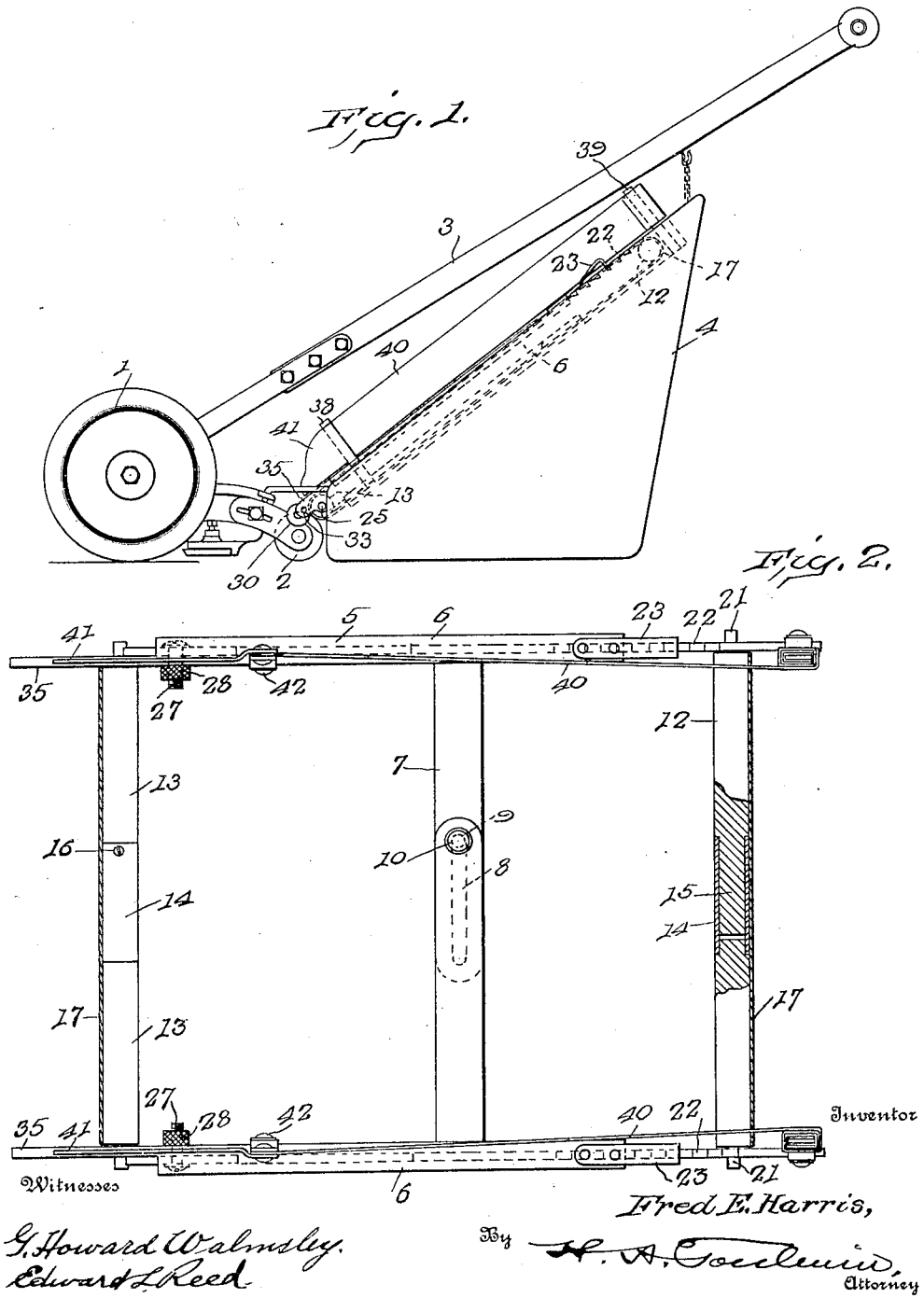

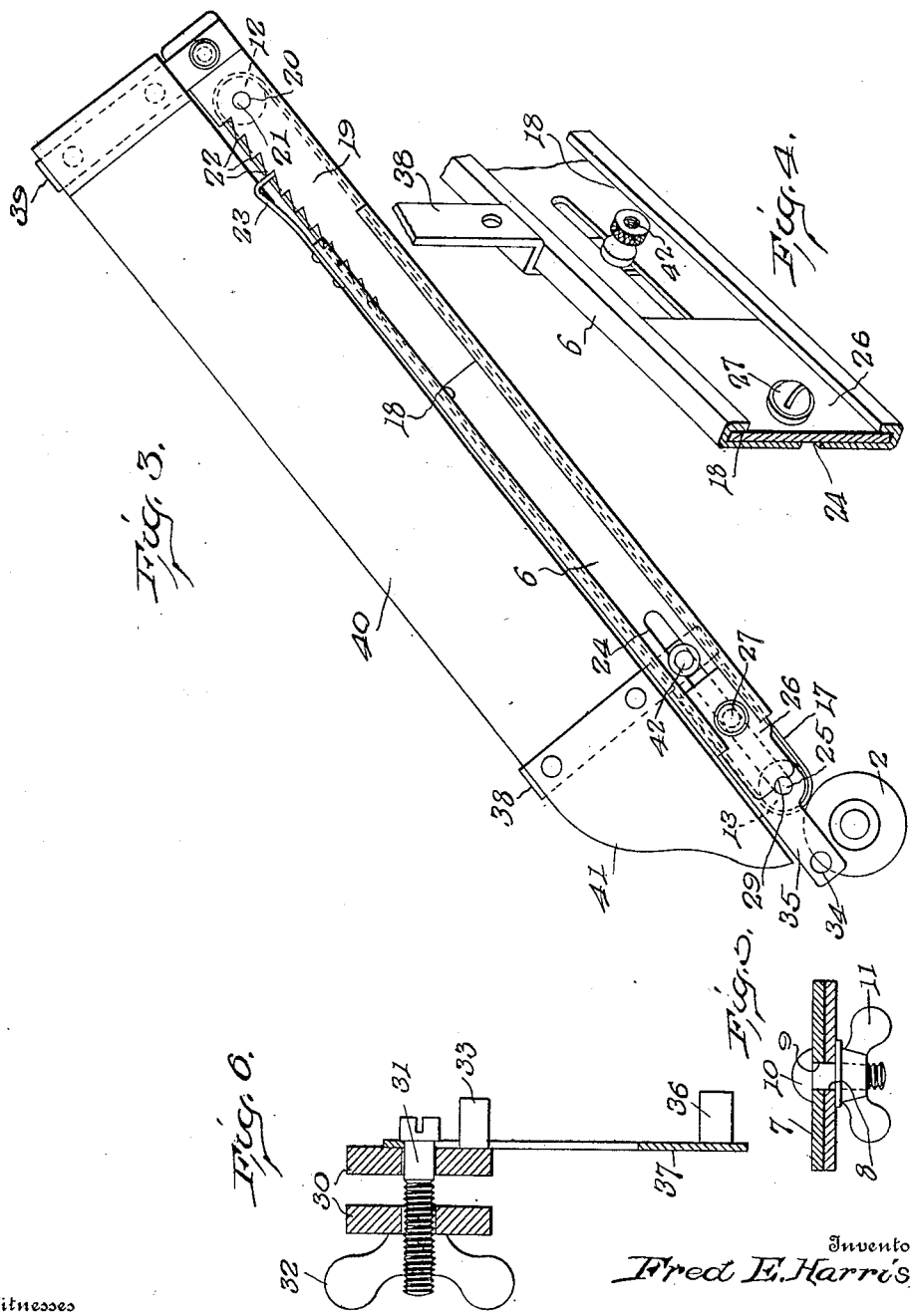

FRED EMERSON HARRIS, OF EDISON, OHIO.

CONVEYER FOR GRASS-CATCHERS FOR LAWN-MOWERS.

No. 926,485.   Specification of Letters Patent.   Patented June 29, 1909.

Application filed July 30, 1908. Serial No. 446,041.

*To all whom it may concern:*

Be it known that I, FRED E. HARRIS, a citizen of the United States, residing at Edison, in the county of Morrow and State of Ohio, have invented certain new and useful Improvements in Conveyers for Grass-Catchers for Lawn-Mowers, of which the following is a specification, reference being had therein to the accompanying drawings.

This invention relates to conveyers for grass catchers for lawn mowers.

The object of the invention is to provide a conveyer, adapted to receive the grass from the mower and convey the same to the rear portion of the grass catcher which will be of such a construction that it can be readily attached to and detached from the lawn mower and grass catcher; which will be adjustable both laterally and longitudinally to accommodate the same to mowers and grass catchers of various sizes; which will be frictionally operated from the ground roller of the mower without the interposition of additional mechanism; which will be provided with guards to prevent the escape of the grass over the sides thereof; and which will be of a simple construction such as to enable a strong, easily operated device to be manufactured at a low cost.

With these objects in view my invention consists in certain novel features of construction and in certain parts and combinations hereinafter to be described, and then more particularly pointed out in the claims.

In the accompanying drawings, Figure 1 is a side elevation of a lawn mower and a grass catcher equipped with the conveyer; Fig. 2 is a top plan view of the conveyer, showing the conveyer fabric and one of the rollers partially broken away; Fig. 3 is a side elevation of the conveyer; Fig. 4 is a fractional detail view of one of the side members of the frame; Fig. 5 is a transverse sectional view of the transverse member of the frame; and Fig. 6 is a detail view of the clamp, showing the same provided with an adjustable pivot pin.

In these drawings, I have illustrated the preferred form of my invention and have shown the same as applied to a lawn mower 1, of ordinary construction having the usual ground roller 2 and handle 3. A grass catcher 4, also of ordinary construction, is secured to the lawn mower in the usual manner. The conveyer comprises an endless belt supported in or near the grass catcher in such a manner that the same will be frictionally engaged by the ground roller 2 and actuated to cause the belt to move in such a direction as to carry the grass, which falls upon the same, upwardly and rearwardly and deposit the same near the rear of the grass catcher. This conveyer preferably comprises a frame indicated as a whole by the reference numeral 5 and comprising side members 6 connected one to the other by means of a transverse member 7 which is preferably secured at its opposite ends to the side members 6 at points between the opposite ends thereof. In order that this frame may be adjusted to accommodate the same to machines of different widths this transverse member 7 is preferably formed in two pieces, one of which is provided with a slot 8, while the other has an aperture 9 adapted to receive a bolt 10 which extends through the aperture 9 and the slot 8 and is provided at its opposite end with a thumb nut 11, thus enabling the transverse or connecting member 7 to be lengthened or shortened to vary the width of the frame. Suitable rollers 12 and 13 are mounted in the side members 6 of the frame near the opposite ends thereof. These rollers are also preferably extensible to enable the same to be lengthened and shortened when the width of the frame is varied, and, to this end, the rollers are preferably formed in two parts, one of which is provided with a sleeve 14 of an exterior diameter substantially equal to the exterior diameter of the roller, the other part of the roller being provided with a reduced portion 15 adapted to fit within the sleeve 14 and to be secured therein in its adjusted position by means of a screw 16, or other suitable device. An endless belt, preferably comprising a strip of fabric 17, extends about the rollers 12 and 13 and forms the conveyer proper which receives the grass from the mower and conveys the same to the rear of the grass catcher. The conveyer is also preferably made extensible longitudinally in order that the same may be adjusted to accommodate it to grass catchers of different lengths, and, to this end, the side members 6 of the frame are preferably formed in two pieces, the main portion thereof having its upper and lower edges bent outwardly and downwardly and upwardly, respectively, to form a guideway 18, within which is mounted a slidable portion 19, in which are formed bearing apertures 20 adapted to receive the pintle 21 of the roller 12. Suitable stops are provided for controlling the movement of the slidable member 19 in the guideway 18, and these stops preferably comprise a series of teeth 22 formed in one edge of the slidable member 19 and a spring dog or pawl 23 carried by the main portion of the side member and adapted to engage said teeth, these teeth preferably having their rearward sides beveled so that the spring pawl 23 will slide over the same when the member 19 is moved outwardly and having their front faces straight and adapted to engage the pawl 23 to resist the inward movement of the slidable member. The roller 13, which is mounted in the lower portions of the side members 6 of the frame 5, is preferably adjustable longitudinally of that frame for a purpose which will hereinafter appear. To this end, the side members 6 are preferably provided near their inner ends with longitudinal slots 24 adapted to receive the pintles 25 of the roller 13. A plate 26 is slidably mounted in the guideway 18 of each side member 6 near the slot 24 and is adjustably mounted therein by means of a bolt 27 having a thumb nut 28. This plate is provided in its inner end with a bearing recess 29 adapted to receive the pintle 25 of the roller 13. By adjusting the plates 26 toward and away from the lower ends of the slots 24 in the side members 6, the bearing recesses 29 against which the pintles of the roller engage may be moved toward or away from the inner end of the frame.

The frame 5 is supported within or near the grass catcher 4 in such a manner as to cause the lower roller 13 carried by the frame to engage, through the medium of the conveyer fabric 17, the ground roller 2 of the lawn mower, the frictional relation of the two rollers being such as to cause the roller 13 of the conveyer to be actuated from the ground roller. I prefer to support the frame of the conveyer in the manner herein illustrated, where I have shown a pair of clamps, each comprising two disks 30 connected one to the other by means of a bolt 31 and a thumb nut 32, adapted to be secured to any convenient portions of the lawn mower. One of the disks of each clamp is provided with an outwardly extending pin 33 which is adapted to engage an aperture 34 formed in that portion 35 of the adjacent side member 6 which extends inwardly beyond the roller 13. Thus, the frame is pivotally secured to the lawn mower at a fixed point, this point being such that the roller 13 will rest upon and be supported by the ground roller 2 of the lawn mower, thus supporting the frame of the conveyer in the desired position relatively to the grass catcher. The position of the frame may be varied and the inner end raised or lowered by moving the roller 13 longitudinally of the frame, as above described, thus causing the roller to engage the ground roller 2 of the lawn mower at different points of its circumference and causing the outer end of the frame to be raised or lowered.

In Fig. 6 of the drawings I have shown the clamp as provided with an adjustable pivot pin 36 which may be used where it is necessary to secure the clamp to the lawn mower at a point removed from the inner end of the frame members 6. This adjustable pivot pin 36 is preferably mounted on a slotted bar 37, which slot extends about the bolt 31 and the pin 33 carried by one of the disks 30 and is adjustable relatively thereto, thus enabling the pivotal support for the frame to be moved inwardly or outwardly and enabling the clamps carrying said supports to be secured at different points on the frame of the mower.

When the conveyer is used with certain types of grass catchers there is a tendency for the grass to fall or to be blown off of the sides of the conveyer, and, to overcome this tendency, I have provided the conveyer, at each side thereof, with guards extending above the surface of the conveyer belt. To this end, I have provided each of the side members 6 with suitable standards 38 and 39 extending at substantially right angles thereto. A strip of fabric or other suitable material 40 is secured at its opposite ends to the standards 38 and 39. In order that this guard may be shortened or lengthened to accommodate it to the longitudinal adjustment of the frame 5 I provide the strip 40 of a length equal to, or greater than, the extreme length of the frame, and, if the frame is shortened I roll the strip about the standard 39 at the outer end of the frame. The forward standard 38 is preferably supported on a bolt 42 mounted in the slot 24 near the inner end of the side member 6 of the frame and may be adjusted longitudinally of that slot to take up any slack that remains in the fabric of the guard after the surplus has been rolled on the rear standard 39. A metal shield 41 extends inwardly from the inner side of each standard 38.

The operation of the device will be readily apparent from the foregoing description and it will be seen that with the device in position within the grass catcher and the roller 13 in engagement with the roller 2, through the medium of the conveyer fabric 17, the forward movement of the lawn mower will cause the roller 13 to be rotated in such a direction as to move the upper surface of the endless belt or conveyer fabric toward the rear of the grass catcher, thus carrying the grass, which is cast upon the same by the mower, rearwardly and discharging the same over the rear end of the conveyer into the grass catcher, the rear end of the conveyer being located a short distance from the rear wall of the grass catcher. The vibration due to the operation of the mower will ordinarily cause the grass to be distributed over the bottom of the grass catcher, but, should the grass pile up in the rear portion thereof, the upper portion of the pile will be engaged by the lower surface of the endless belt which will tend to move the same forwardly, thus packing the same closely into the grass catcher. When it is desired to gain access to the interior of the grass catcher to empty the same, or for any other purpose, the conveyer frame may be so moved about its pivotal center to turn the same forwardly, thus moving the same away from the grass catcher and permitting the catcher to be emptied or to be removed from the lawn mower. It will also be apparent that I have provided a device of this character which is readily attachable to and detachable from lawn mowers and grass catchers of various sizes and types, the conveyer being adjustable both laterally and longitudinally to accommodate the same to the varying sizes thereof. Further, it will be seen that the conveyer is actuated through frictional engagement with the ground roller of the lawn mower without the interposition of additional mechanism or operating devices. And further, it will be apparent that the device is of a very simple construction and is capable of being constructed in a strong, durable manner at a very low cost.

I wish it to be understood that I do not desire to be limited to the details of construction shown and described, for obvious modifications will occur to a person skilled in the art. For instance, it will be obvious that, while I have shown and described the conveyer as comprising an endless belt, other conveyer mechanism could be substituted for such a belt and the term "conveyer belt," as employed in the specification and claims, is used in a broad sense to cover any such conveyer mechanism.

Having thus fully described my invention, what I claim as new and desire to secure by Letters Patent, is:—

1. In a device of the character described, the combination, with a lawn mower comprising a frame and ground wheels carried thereby, a ground roller mounted on said frame, and a grass catcher connected to said lawn mower, of a conveyer supported near said grass catcher, and frictional driving means connected with said conveyer and in operative engagement with said roller.

2. In a device of the character described, the combination, with a lawn mower comprising a frame and ground wheels carried thereby, a ground roller mounted on said frame, and a grass catcher connected to said lawn mower, of a conveyer supported near said grass catcher and comprising a frame, a roller mounted in said frame near said first-mentioned roller and adapted to be frictionally operated thereby, and a conveyer belt extending about said last-mentioned roller.

3. In a device of the character described, the combination, with a lawn mower comprising a frame and ground wheels carried thereby, a ground roller mounted on said frame, and a grass catcher connected to said lawn mower, of a conveyer supported near said grass catcher and comprising a frame, a roller mounted in said frame and supported in frictional engagement with the first-mentioned roller, and a conveyer belt extending about the last-mentioned roller.

4. In a device of the character described, the combination, with a lawn mower, a roller carried thereby, and a grass catcher connected to said lawn mower, of a conveyer comprising a frame pivotally connected to said lawn mower, a roller carried by said frame and adapted to be supported on the first-mentioned roller, and a conveyer belt extending about the last-mentioned roller.

5. In a device of the character described, the combination, with a lawn mower, a roller carried thereby, and a grass catcher connected to said lawn mower, of a conveyer comprising a frame pivotally connected to said lawn mower, a roller carried by said frame and adapted to be supported on the first-mentioned roller, means for adjusting said roller longitudinally of said frame, and a conveyer belt extending about the last-mentioned roller.

6. In a device of the character described, the combination, with a lawn mower, a roller carried thereby, and a grass catcher connected to said lawn mower, of a conveyer comprising a laterally extensible frame adapted to be pivotally connected to said lawn mower, extensible rollers carried by said frame, frictional means for actuating one of said rollers, and a conveyer belt extending about the rollers carried by said frame.

7. In a device of the character described, the combination, with a lawn mower, a roller carried thereby, and a grass catcher connected to said lawn mower, of a conveyer comprising a longitudinally extensible frame pivotally connected to said lawn mower, rollers carried by said frame, frictional means for actuating one of said rollers, and a conveyer belt extending about the rollers carried by said frame.

8. In a device of the character described, the combination, with a lawn mower, a roller carried thereby, and a grass catcher connected to said lawn mower, of a conveyer comprising a longitudinally and laterally extensible frame, means for pivotally connecting said frame to said lawn mower, rollers carried by said frame and supported on the first-mentioned roller, and a conveyer belt extending about the rollers carried by said frame.

9. In a device of the character described, the combination, with a lawn mower, a roller carried thereby, and a grass catcher connected to said lawn mower, of a conveyer comprising a longitudinally and laterally extensible frame, rollers journaled in said frame, means beyond the innermost of said rollers for pivotally connecting said frame to said lawn mower, said innermost roller being in frictional engagement with the roller carried by said lawn mower, and a conveyer belt extending about the rollers carried by said frame.

10. In a device of the character described, the combination, with a lawn mower, a roller carried thereby, and a grass catcher connected to said lawn mower, of a conveyer comprising a frame pivotally connected to said lawn mower, a roller carried by said frame and adapted to be supported on the first-mentioned roller, guards mounted on the opposite sides of said frame and extending longitudinally thereof, and a conveyer belt extending about the roller carried by said frame.

11. In a device of the character described, the combination, with a lawn mower, a roller carried thereby, and a grass catcher connected to said lawn mower, of a conveyer comprising a frame having side members, rollers journaled in said frame, a conveyer belt extending about said rollers, each of said side members having an aperture near the inner end thereof, clamps adapted to be secured to a part of said lawn mower, and lugs carried by said clamps and adapted to engage the apertures in said side members.

12. In a device of the character described, the combination, with a lawn mower, a roller carried thereby, and a grass catcher connected to said lawn mower, of a conveyer comprising a frame having side members, rollers journaled in said frame, a conveyer belt extending about said rollers, each of said side members having an aperture near the inner end thereof, clamps adapted to be secured to a part of said lawn mower, lugs adapted to enter the apertures in said side members, and means for securing said lugs to said clamps.

13. In a device of the character described, the combination, with a lawn mower comprising a frame and ground wheels carried thereby, a ground roller mounted on said frame and a grass catcher connected to said lawn mower, of a conveyer and frictional driving means connected with said conveyer and in operative engagement with said roller.

In testimony whereof, I affix my signature in presence of two witnesses.

FRED EMERSON HARRIS.

Witnesses:
H. C. LYMAN,
JAY ALBRIGHT.